United States Patent [19]
Reddy et al.

[11] 4,131,798
[45] Dec. 26, 1978

[54] ARRAY GAMMA COUNTER

[75] Inventors: Reddy R. V. Reddy, Deerfield; Michael E. Jolley, Round Lake, both of Ill.

[73] Assignee: Abbott Laboratories, North Chicago, Ill.

[21] Appl. No.: 784,900

[22] Filed: Apr. 5, 1977

[51] Int. Cl.² .............................................. G01T 1/00
[52] U.S. Cl. .................................................. 250/328
[58] Field of Search ................... 250/328, 363 S, 364, 250/366, 369, 370

[56] References Cited

U.S. PATENT DOCUMENTS

| 2,770,773 | 12/1954 | Cooley | 324/37 |
| 3,796,879 | 3/1974 | Obrycki | 250/366 |
| 4,005,292 | 1/1977 | Oesterlin et al. | 250/328 |

Primary Examiner—Alfred E. Smith
Assistant Examiner—Janice A. Howell
Attorney, Agent, or Firm—Robert L. Niblack; Nate F. Scarpelli

[57] ABSTRACT

A radioactive particle counter for a plurality of discrete radioactive particle emitting samples, including a plurality of detectors for each sample to simultaneously detect the respective emitted radioactive particles and provide a respective electrical signal, a plurality of storage counters for simultaneously accumulating the respective sample count during a predetermined counting interval, and a read-out control unit for periodically, sequentially reading out the accumulated sample count in each storage counter and coupling same to a control counter for temporary display of the accumulated sample count or for eventually totalling of the respective sample count.

10 Claims, 5 Drawing Figures

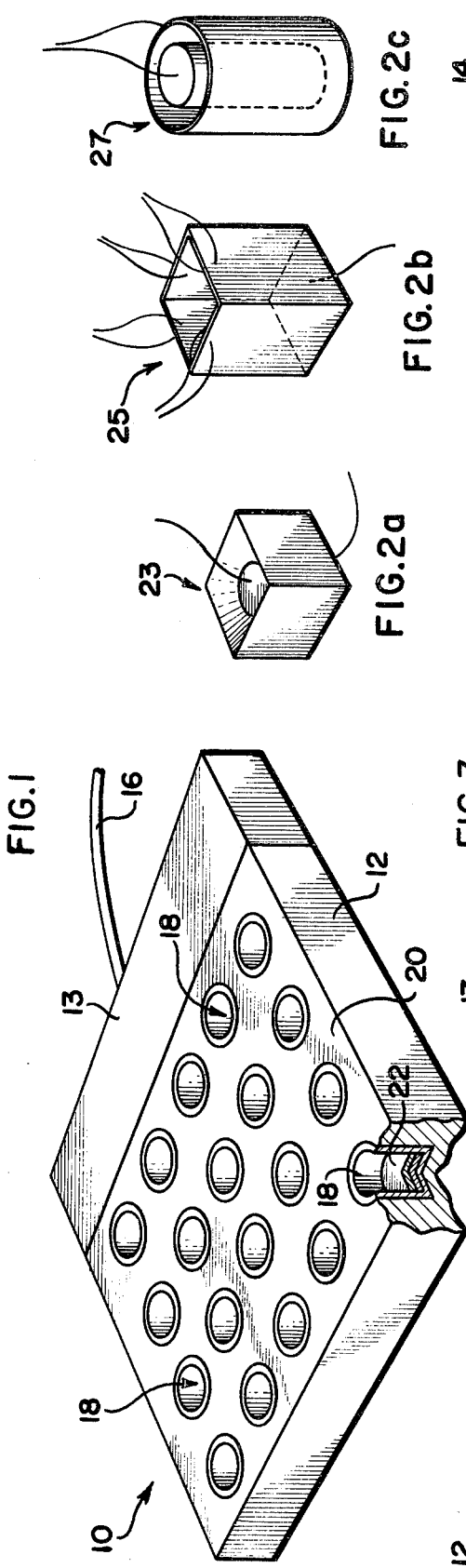
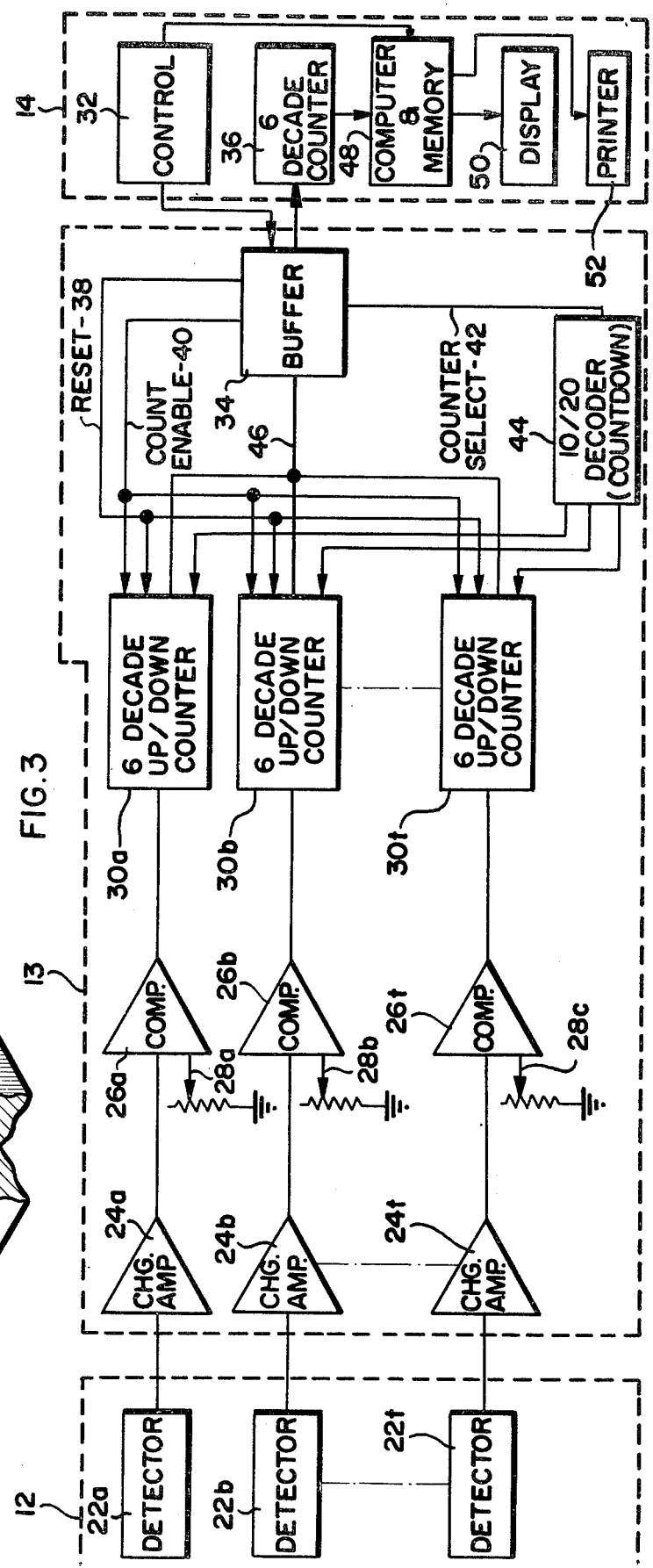

ARRAY GAMMA COUNTER

This invention relates to radioactive particle counters and more particularly to apparatus for counting the respective radioactive particles eminating from a plurality of samples containing radioactive particles.

BACKGROUND OF THE INVENTION

Reference may be made to the following U.S. patents: 3,509,339; 3,509,341; 3,578,960; and 3,717,762. In presently available diagnostic apparatus, discrete portions of radioactive particle emitting samples are analyzed by detecting and measuring the radioactive sample counts over a long time interval. There are also presently available scanning type devices which are used to scan portions of the human body and locate the distribution of radioactive material previously injected. The above listed U.S. patents illustrate embodiments of each type.

While the aforementioned prior art is suitable for the purposes indicated, it is desired to simplify and to make more compact and reliable the rather large, multiple components required by such prior art systems, particularly when it is desired to count the radioactive particles from multiple samples. In the detecting portion of the prior art, visible light emitting crystals are used, such as sodium iodide crystals which emit visible light when impinged by gamma radiation. Various forms of collimator members formed of radioactive opaque material are used to channel the emitted radiation to the crystal and to otherwise prevent undesired or spurious radiation sources from impinging on the sodium iodide crystal. The emitted visible light from the sodium iodide crystal is then converted and amplified by a photomultiplier tube to provide the corresponding electrical signals relating to the detected count sample. Such prior art diagnostic systems are rather large and particularly cumbersome.

Also, in instances where there are a number of samples to be counted, it is desired to be able to obtain accumulated sample count over repeated predetermined time intervals for each sample, rather than completing the measuring of sample counts for each sample before beginning measurement of the next sample. In the case of gamma radiation sample counting for instance, as an illustration, let us assume it normally requires approximately one minute to accumulate about ten thousand sample counts in order to provide approximately a 1% sample count precision. Thus, in this illustration, if 100 samples were being analyzed on a sequential, serial analysis procedure, the sample count for 60 samples would be obtained in about one hour, whereas no sample count information would be obtained or available on the remaining 40 samples during the first hour. It is therefore desired to provide a simplified multiple sample analysis or diagnostic system wherein sample count data can be rapidly and reliably obtained for each of the samples. In some instances it is also preferred to display or print the preliminary, periodic, accumulated sample count as obtained so as to provide a periodic check on the system operation.

SUMMARY OF THE INVENTION

In accordance with the principles of the present invention there is provided improved apparatus for detecting and counting radioactive particles eminating from discrete samples in a plurality of samples to be analyzed. The apparatus includes a cadmium telluride crystal for each sample providing an electrical pulse signal in direct response to the radioactive particles eminating from the associated sample. Other radioactive particle to electrical pulse signal direct conversion transducers, such as silicon or germanium crystals may be utilized as the detector, thereby eliminating the previously required collimating members and photomultiplier tube. The pulse output of each direct conversion detector is coupled to a respective storage counter for accumulating the sample counts for each sample so that direct detection and counting is provided simultaneously for each sample in a parallel counting mode. Periodically a computer control unit, in accordance with preset time intervals, sequentially reads the respective accumulated sample count out of each storage counter and couples this information to a control counter for display, if desired, and also to a computer-memory unit for storage and further processing, such as totalling the respective sample count.

The apparatus thus enables parallel sample counting of multiple samples in order to obtain a faster average count per sample in a compact unit without any moving parts, thereby increasing reliability over the prior art. In addition, on-line accumulated count sample information with respect to each of the samples being analyzed is readily available for display from the memory, if a periodic check of the system operation is preferred.

BRIEF DESCRIPTION OF THE DRAWINGS

FIG. 1 illustrates improved apparatus for obtaining a discrete count sample of the radioactive particles being emitted from a plurality of samples;

FIGS. 2a, 2b, and 2c illustrate alternative configurations of a direct conversion, radioactive particle detector; and FIG. 3 is a schematic diagram illustrating the counting apparatus for parallel counting and sequentially, serially computing, displaying and/or printing the sample count in an on-line manner.

DETAILED DESCRIPTION

Referring now to FIGS. 1 and 3, there is illustrated apparatus 10 including a detector module 12, counter module 13, and a control module 14 interconnected by a suitable cable such as cable 16 for coupling information therebetween. The detector module 12 includes a plurality of radioactive particle emitting sample positions in an array such as a 4×5 matrix, wherein each sample position includes a cup 18 or cavity located in top surface 20 with a radioactive particle detector 22 placed at the bottom of the cup or cavity in contact with the sample or at least immediately adjacent thereto. The detector material may be indium chloride doped cadmium telluride, silicon or germanium crystals for detecting gamma radiation from radio isotopes generated in each sample during, for example, a radio-pharmaceutical assay and providing an electrical pulse output signal for each sample count.

Rather than the rectangular matrix shown in FIG. 1, it is understood, of course, that the samples may be arranged in circular configuration if desired. The spacing between the centers of each detector may correspond to a known configuration of laboratory samples or test tube racks, for example, 0.75 inch. Each detector 22 can be constructed from a single rectangular or circular crystal as shown in FIG. 1, or can be in the configuration of a shallow well detector crystal 23, as shown in FIG. 2a. Another embodiment is shown in FIG. 2b in which five or more semiconductor wafers 25 may be arranged to have walls and floors to form a rectangular well, the output of all of the individual detectors being connected to a single amplifier. Still another detector configuration is shown in FIG. 2c wherein a radioactive particle emitting sample may be inserted between concentric inner-outer cylindrical semiconductor wafers 27.

While the cadmium telluride crystals can operate effectively at room temperature, the use of silicon or germanium detectors would require suitable cooling apparatus to cool such crystals to their appropriate operating temperatures. A typical diameter or length of cadmium telluride crystals is between 1–1.5 centimeters having a thickness of approximately 1–2 millimeters. In any event, the aforementioned direct conversion crystals are immediately adjacent a radioactive particle emitting sample so as to be impinged by the radioactive particles and directly provide electrical pulses corresponding to a sample count, thereby eliminating the need for collimating members and photomultiplier tubes.

FIG. 3 schematically illustrates the components contained within the detector, counter and control modules and their interconnections. Each detector 22a through 22t has an associated amplifier such as charge amplifier 24a for initially amplifying the pulse signal from the detector corresponding to a detected radioactive particle emitted from a discrete sample. The output of each amplifier 24a–24t is coupled to the input of a respective comparator 26a–26t having a respective threshold adjustment 28a–28t with the output from the comparators each being coupled to a respective six decade up-down storage counter 30a–30t.

Thus, the output of each detector 22a–22t is amplified in the associated charge sensitive amplifier 24a–24t and applied to a respective comparator 26a–26t. The other input to each of the comparators is provided by a respective threshold adjusting potentiometer 28a–28t. The threshold level is set so as to prevent background noise or other spurious pulses setting an erroneous count in the system. If the amplitude of the output pulse from the detector exceeds that set by the respective threshold 28a–28t, a pulse corresponding to the detection of a radioactive particle emission appears at the output of the comparator and is applied to the associated decade counter. Each counter 30a–30t thus accumulates the count corresponding to the emitted radioactive particles detected by a respective detector 22a–22t.

As can be seen from FIG. 3, each sample count is accumulated simultaneously in the parallel counting mode. Parallel counting of the multiple samples enables the average count per sample to be obtained much faster than the normal serial counting of samples. Thus, for the 20 sample array illustrated herein, the sample count for all samples can be obtained in 1/20th the time necessary for serial counting. Since radioactive particle counting is an accumulation procedure over a relatively long time interval, such as one minute per sample for gamma radiation, the savings in time using the present parallel counting for multiple samples is significant.

The control module 14 includes a logic control portion 32 which through a buffer circuit 34 in the counter module 13 controls a selected transfer of accumulated respective sample counts in each of the storage counters 30a through 30t to a separate six-decade counter 36 in the control module. To accomplish this the logic control 32 provides through buffer 34 a reset signal on reset line 38; a count enable signal on line 40; and a counter select signal on line 42. The reset signal on line 38 resets each of the counters 30a through 30t and upon receipt of a count enable signal on line 40, each of the counters 30a through 30t is enabled to initiate a sample count and store detector pulses from the respective detectors for a preset time determined by the control unit 32. At the end of the preset time, the control unit 32 presents a disable signal on line 40 to stop the sample counting. Control 32 then provides a storage counter select signal on line 42 through a decoder 44 to select one of the storage counters 30a through 30t for reading out the accumulated count at high speed. The sample count read out from a particular counter 30 is transferred through line 46 via buffer 34 to the control counter 36 from which the count may be stored in computer memory 48 for further calculations and totalling of the respective sample count or may be displayed in display unit 50 or on printer 52.

This enables a plurality of the radioactive emitting samples to be counted very quickly in parallel in counters 30a through 30t with the accumulated count being provided serially in control module 14. The respective sample count for the preset time interval can be displayed or if desired, the accumulated sample count over several time intervals may be selected for display.

The foregoing detailed description has been given for clearness of understanding only, and no unnecessary limitations should be understood therefrom, as modifications will be obvious to those skilled in the art.

What is claimed is:

1. Apparatus for detecting and counting radioactive particles eminating for discrete samples in a plurality thereof comprising:
   a plurality of detectors each immediately adjacent a respective discrete sample directly converting the respective number of radioactive particles eminating from a discrete sample to a corresponding electrical signal;
   a plurality of counters each coupled to a respective detector for simultaneously providing a sample count in each counter responsive to the respective electrical signal;
   control means coupled to each of said counters for enabling the accumulation of said sample count in each counter during repetitive, predetermined counting time intervals, said control means including count enable means and count disable means,
   said count enable means providing an enable signal to each of said counters for initiating said respective sample count and said disable means thereafter providing a disable signal at the end of each of said repetitive, predetermined counting time intervals to each of said counters for stopping the respective sample count; and
   read-out means responsive to said control means for periodically, sequentially reading out the accumulated sample count in each of said counters at the end of each of said predetermined counting time intervals.

2. Apparatus according to claim 1, wherein said plurality of detectors each includes a cadmium telluride crystal responsive to the radioactive particle emission from a discrete sample to provide a corresponding electrical signal from which the sample count may be obtained.

3. Apparatus according to claim 2, including a tray having a plurality of respective mounting positions for mounting each of said crystals and for locating said discrete samples immediately adjacent a respective crystal.

4. Apparatus according to claim 3, wherein said crystals each includes a well portion for locating a respective discrete sample.

5. Apparatus according to claim 3, wherein said crystals each includes an enclosure portion for substantially enclosing a discrete sample.

6. Apparatus according to claim 1, including processing means for receiving said sequentially read-out accumulated sample count from each respective counter during said repetitive predetermined counting time intervals for providing a total sample count for each discrete sample.

7. Apparatus according to claim 1, wherein said read-out means includes a decoder having a plurality of output lines each connected to a respective one of said counters, said decoder responsive to the end of said predetermined counting time interval for initiating said sequential read-out of the accumulated sample count in each counter.

8. Apparatus for detecting and counting radioactive particles eminating from discrete samples in a plurality thereof comprising:
   a plurality of detectors each responsive individually to the radioactive particles eminating from a respective one of said plurality of samples and directly providing an electrical signal corresponding to the respective number of said radioactive particles;
   a plurality of storage counters each coupled to a respective detector for receiving said electrical signal and providing continuous count data storage indicative of the number of radioactive particles eminating from each sample;
   display means for displaying said respective count data from each sample;
   count means coupled to said display means and to each of said plurality of storage counters for sequentially initiating reading of count data from each of said storage counters after a predetermined counting time interval, said control means including count enable means and count disable means,
   said count enable means providing an enable signal to each of said storage counters for initiating said respective count data and said count disable means thereafter providing a disable signal at the end of said predetermined counting time interval to each of said storage counters for stopping the respective count data; and
   control counter means coupled to said display means and to said plurality of storage counters for sequentially reading said respective count data after a predetermined counting time interval and selectively transferring same to said display means in response to said control means.

9. Apparatus according to claim 8, wherein said plurality of detectors each includes a cadmium telluride crystal.

10. A radioactive particle detector and counter apparatus for determining, in a plurality of discrete radioactive particle emitting samples, the sample count of radioactive particles eminating from each discrete sample, said apparatus comprising:
   a frame having an array of sample positions for releasably maintaining one of said discrete samples at each sample position;
   a detector mounted at each of said sample positions immediately adjacent a respective sample for receiving said emitted radioactive particles and providing an electrical signal representing the sample count;
   a plurality of counters;
   means for coupling each of said counters to said electrical signal from a respective detector for simultaneously obtaining the respective sample count for each of said discrete samples;
   count enable and select means coupled to each counter for enabling the accumulation of said sample count in each counter during repetitive, predetermined counting time intervals and for sequentially enabling the read-out of said respective accumulated sample count from each counter at the end of a respective, predetermined counting time interval; and
   processing means, including display means, responsive to said count enable and select means for receiving and displaying said respective, sequentially read-out accumulated sample count in each counter and for providing a total sample count display for each discrete sample.

* * * * *